Figure 3:
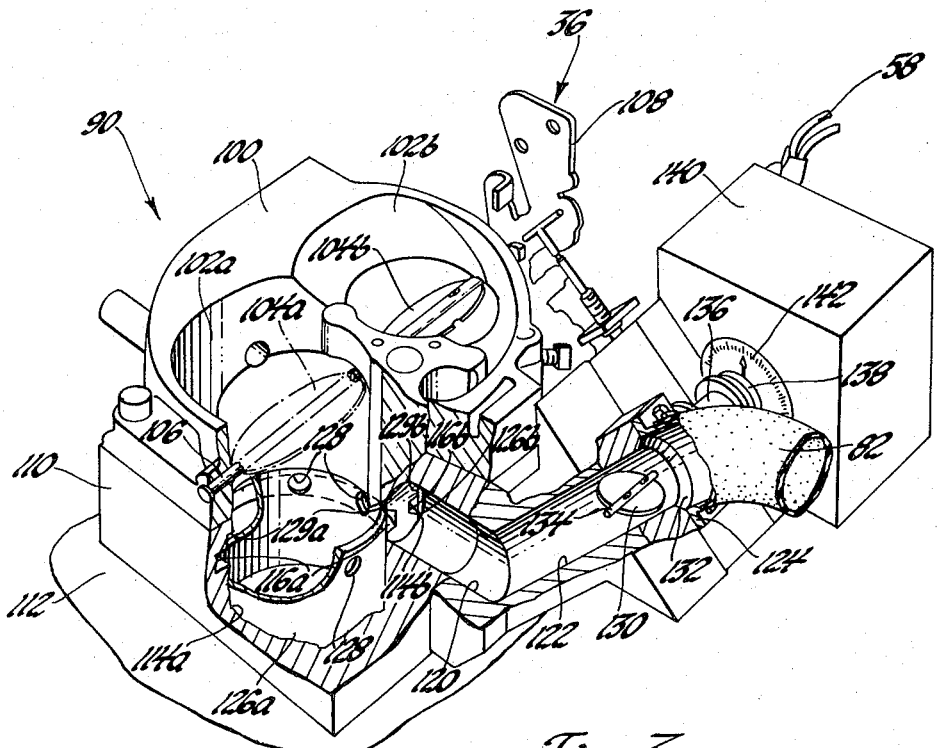

United States Patent [19]
Taplin et al.

[11] 3,872,846
[45] Mar. 25, 1975

[54] EXHAUST GAS RECIRCULATION (EGR) INTERNAL COMBUSTION ENGINE ROUGHNESS CONTROL SYSTEM

[75] Inventors: Lael B. Taplin, Livonia; William R. Seitz; Chun Keung Leung, both of Farmington, all of Mich.

[73] Assignee: The Bendix Corporation, Southfield, Mich.

[22] Filed: Mar. 29, 1973

[21] Appl. No.: 346,239

Related U.S. Application Data
[63] Continuation-in-part of Ser. No. 249,440, April 24, 1972.

[52] U.S. Cl. .................. 123/119 A, 60/278, 60/279
[51] Int. Cl. ............................................ F02m 25/06
[58] Field of Search ........ 123/119 A, 198 D, 198 E; 60/278, 279

[56] References Cited
UNITED STATES PATENTS

| | | | |
|---|---|---|---|
| 2,628,606 | 2/1953 | Draper et al. ........................ | 123/102 |
| 2,920,481 | 1/1960 | Hulswit et al. ....................... | 73/146 |
| 3,142,967 | 8/1964 | Schweitzer .......................... | 60/105 |
| 3,596,643 | 8/1971 | Schweitzer .......................... | 123/102 X |
| 3,636,934 | 1/1972 | Najakima et al. ..................... | 60/278 |
| 3,648,672 | 3/1972 | Muroki et al. ....................... | 123/119 A |
| 3,673,993 | 7/1972 | Nakajima et al. ..................... | 123/119 A |
| 3,713,428 | 1/1973 | Sandhagen ........................... | 123/119 A |
| 3,724,433 | 4/1973 | Voss et al. .......................... | 123/102 |
| 3,738,342 | 6/1973 | Lewakowski .......................... | 123/119 A |
| 3,788,284 | 1/1974 | Gardner ............................. | 123/119 A |
| 3,807,376 | 4/1974 | Glocker et al. ...................... | 123/119 A |

FOREIGN PATENTS OR APPLICATIONS

| | | | |
|---|---|---|---|
| 610,960 | 12/1960 | Canada ............................. | 123/102 |

OTHER PUBLICATIONS
SAE Paper No. 720254, "Control of Exhaust Pollution through a Mixture-Optimizer," by P. H. Schweitzer. Jan. 10–14, 1972.

*Primary Examiner*—Charles J. Myhre
*Assistant Examiner*—Tony Argenbright
*Attorney, Agent, or Firm*—Gerald K. Flagg

[57] ABSTRACT

A closed loop internal combustion engine control system is provided for controlling the exhaust gas recirculation flow of an internal combustion engine so as to regulate engine roughness at a predetermined level. The control system receives an input signal indicative of the engine roughness and generates therefrom an EGR valve command signal for varying the position of a variable position EGR servo-valve so as to effect the maximum possible EGR flow compatible with a predetermined maximum level of engine roughness.

23 Claims, 4 Drawing Figures

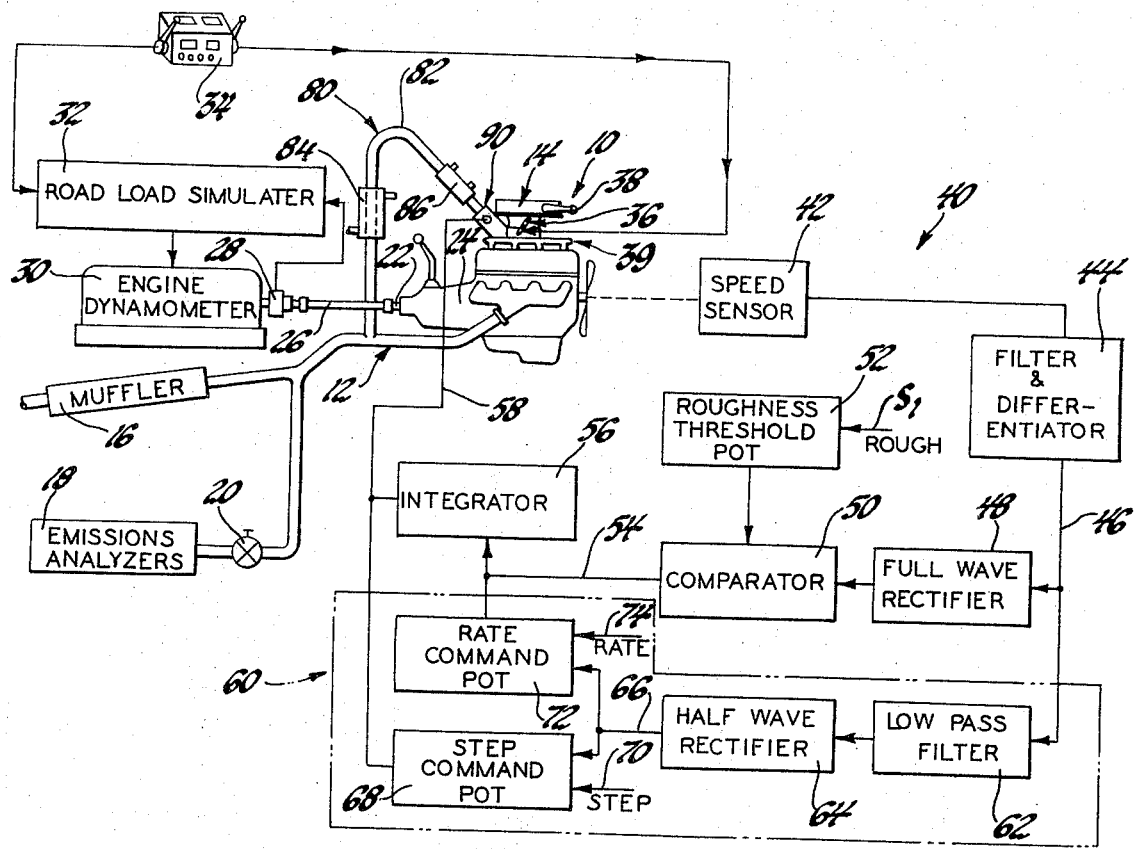

EXHAUST GAS RECIRCULATION (EGR) INTERNAL COMBUSTION ENGINE ROUGHNESS CONTROL SYSTEM

This application is a continuation-in-part of commonly assigned application 249,440 filed on Apr. 24, 1972 and entitled "Surge Sensory Apparatus For A Prime Mover."

The present invention relates to closed loop engine controls in general and in particular to closed loop engine controls of the type that control the flow of exhaust recirculation gases of an engine so as to regulate engine roughness at an acceptable level.

It is known that the formation of the nitrous oxides $NO_x$ constituents of the exhaust gas products of an internal combustion engine may be reduced by recirculating a portion of the exhaust gas to the engine air/fuel intake passage so as to dilute the incoming air/fuel charge with inert $N_2$, $H_2O$, and $CO_2$. The molar specific heat of these gases and especially of $CO_2$ absorb substantial thermal energy so as to lower peak cycle temperatures to levels reducing $NO_x$ formation.

While $NO_x$ formation is known to decrease as the exhaust gas recirculation (EGR) flow increases to where it represents about 20% of the exhaust gas constituents, it is also known that engine roughness increases with increasing EGR. Therefore, one factor limiting the magnitude of EGR is the magnitude of EGR-induced engine roughness that can be tolerated before vehicle driveability becomes unacceptable. Not only has this relationship between increasing EGR and engine roughness been known, but also the contribution to unacceptable vehicle driveability by such EGR-induced engine roughness has been measured. For example, the resulting fore and aft linear motion of the vehicle body has been measured as described in the paper "Measuring Vehicle Driveability" by R. L. Everett, published as paper No. 710137 for the Jan. 11-15, 1971 Conference of the Society of Automotive Engineers.

Moreover, closed loop control systems for controlling a parameter of an internal combustion engine are known in the art as are EGR control systems, even though the latter have not heretofore been of the closed loop type. An example of the former control system is disclosed in the U.S. patent to Draper and Li No. 2,628,606 and in the paper "Principles of Optimizing Control System In An Application To The Internal Combustion Engine" by C. S. Draper and Y. P. Li, published September 1951 by the American Society of Mechanical Engineers, and an example of an EGR control device is disclosed in the U.S. patent to Sciabica No. 3,610,219 issued Oct. 5, 1971 and entitled "Exhaust Gas Recirculation Control."

The Draper paper discloses an optimizing system for oscillating or dithering the air flow and/or fuel flow of an internal combustion engine and then using the effects of such dithering to control the operation of the engine so as to seek out and operate at its optimum power point. Such optimizing systems inherently effect some reduction in $NO_x$ formation since the air/fuel mixture producing the optimum power is on the lean side of the stoichiometric air/fuel ratio, such leanness being known to reduce $NO_x$ formation. However, the power optimization technique has not been incorporated in mass produced internal combustion engines and therefore the reduction in $NO_x$ formation that might have been realized thereby has not been obtained. Moreover, an attempt to commercially adopt this technique would be hindered by a combination of factors including the fact that such systems are not only ineffectual at idle and wide-open throttle conditions, two entirely normal modes of operation where formations of emissions must nevertheless be controlled, but also must be cut out or disconnected when the engine begins to run rough or misfire. Another factor is that the dithered momentary power changes are effected only indirectly and then through a time-and-phase lag susceptible system, such system incurring the cost and serviceability penalties of the extra equipment associated therewith.

The Sciabica patent discloses apparatus for controlling and limiting the movement of an EGR control valve in accordance with the position of a throttle valve and for compensating an electronically controlled fuel injection system in accordance with the position of the exhaust gas recirculation valve. The movement of the EGR valve is controlled in the opening and not, as a safety measure, the closing direction and the valve is thus prevented by at least the position of the throttle valve from being independently opened to increase the EGR flow up to a point at which engine roughness becomes unacceptable. The Sciabica patent also indicates that the EGR valve is maintained in a closed position during idle and wide-open throttle conditions and, thus as with the Draper power optimization technique, such device prevents EGR control to effect a given level of driveability during these normal modes. Also, both the Draper power optimization technique and the Sciabica exhaust valve control device, to the extent that they prevent operation at the threshold of unacceptable vehicle driveability, prevent the maximum $NO_x$ reduction that is obtainable at such limit. In short, notwithstanding the knowledge of the effect of the magnitude of EGR on vehicle driveability, of the means for measuring vehicle driveability, of a closed loop control system, and of EGR valve control devices, the flow of exhaust recirculation gases has heretofore not been controlled in a manner to maintain engine operation right at the threshold of unacceptable driveability nor has driveability been controlled as the controlled parameter of a closed loop control system.

It is desirable to be able to control $NO_x$ formation during all modes of engine operation, and it is desirable to do so without causing vehicle driveability to become unacceptable. It is also desirable to control $NO_x$ formation by controlling a clearly measurable parameter the magnitude of which is adjustable to permit tradeoff between vehicle driveability and $NO_x$ formation.

It is, therefore, a prominent object of the present invention to provide a new and improved closed loop control system for reducing the formation of certain exhaust gas constituents of an internal combustion engine.

It is another primary object of the present invention to provide a closed loop control system for regulating engine roughness.

It is another object of the present invention to provide a closed loop control system that controls the flow of exhaust recirculation gases so as to maintain engine operation at the threshold of unacceptable engine roughness. And, it is another object of the present invention to provide the closed loop control system of the foregoing type wherein the magnitude of engine roughness is determined by sensing and differentiating the speed changes of a rotatable member and the flow of exhaust recirculation gases is controlled in accordance with the magnitude of the speed changes.

Furthermore, recognizing that the magnitude of engine roughness effects vehicle driveability oppositely from the EGR influenced formation of $NO_x$, the present invention as another of its objects provides a closed loop control system for controlling engine roughness at a magnitude which is selected to effect a tradeoff between vehicle driveability and $NO_x$ formation.

It is a further object of the present invention to provide a closed loop control system responsive to the magnitude of engine roughness so as to maintain as high a flow of exhaust recirculation gases as possible without exceeding a predetermined level of engine roughness.

Furthermore recognizing that it is desirable for both vehicle performance and $NO_x$ reduction purposes to change the schedule of fuel delivered to the engine during certain modes of certain engine operation, the present invention as another of its objects provides a closed loop control system that normally maintains the flow of exhaust recirculation gases as high as possible so as to just follow the threshold of unacceptable engine roughness during some modes of engine operation and that permits the different fuel control to be effected during other modes of operation.

Furthermore recognizing that $NO_x$ formation increases sharply with driver commanded accelerations and that such accelerations comprise low frequency components of engine roughness, the present invention, as a still further object, provides closed loop control system for preventing sharp increases in $NO_x$ formation during driver commanded accelerations by controlling the flow of exhaust recirculation gases during such accelerations in accordance with the magnitude of the low frequency components of engine roughness.

It is another object of the present invention to provide an engine control system of the foregoing type wherein the flow of exhaust recirculation gases is increased so as to reduce $NO_x$ formation only when the low frequency of components of engine roughness exceed a predetermined magnitude.

Recognizing still further that it is desirable to vary the flow of exhaust recirculation gases so as to control $NO_x$ formation during both driver commanded acceleration and during other modes of engine operation, the present invention as a further object provides a closed loop control system for normally controlling the flow of exhaust recirculation gases in accordance with only high frequency components of engine roughness.

It is a further object of the present invention to provide a closed loop control system for controlling EGR flow in accordance with engine roughness so as to normally maintain the magnitude of engine roughness at a first predetermined level, the engine control system also preventing a decrease in the flow of exhaust recirculation gases when the magnitude of the low frequency components of engine roughness exceed a second predetermined level.

It is another object of the present invention to provide an engine control system of the foregoing type wherein the flow of exhaust recirculation gases is increased as long as the low frequency components of engine roughness exceed a predetermined level even when all components of engine roughness exceed the first predetermined level.

In accordance with the present invention, a tachometer suitably coupled to a crankshaft driven member of an internal combustion engine senses both the high frequency speed changes thereof resulting from EGR-induced engine roughness as well as the low frequency speed changes resulting from driver commanded performance changes. The speed signal developed by the tachometer is attenuated by a filter to pass only those frequencies of interest and is then differentiated by a differentiator to provide a raw roughness signal varying with a derivative of the signal. The raw roughness signal is full wave rectified by a full wave rectifier and is thereafter compared by a comparator with a roughness threshold reference, the magnitude of which is selected to effect a tradeoff between $NO_x$ formation and unacceptable vehicle driveability. The output of the comparator is applied to an integrator which produces an output increasing in magnitude when the engine roughness is below the acceptable driveability level and increasing in magnitude when the roughness is above this level. The output of the integrator causes an exhaust recirculation flow control valve to bias the flow of exhaust recirculation gases in an increasing direction as long as the engine roughness is below the acceptable level and to decrease the flow when the roughness momentarily exceeds this level, the net effect of the control system being to regulate the roughness at this level.

Figure 4:
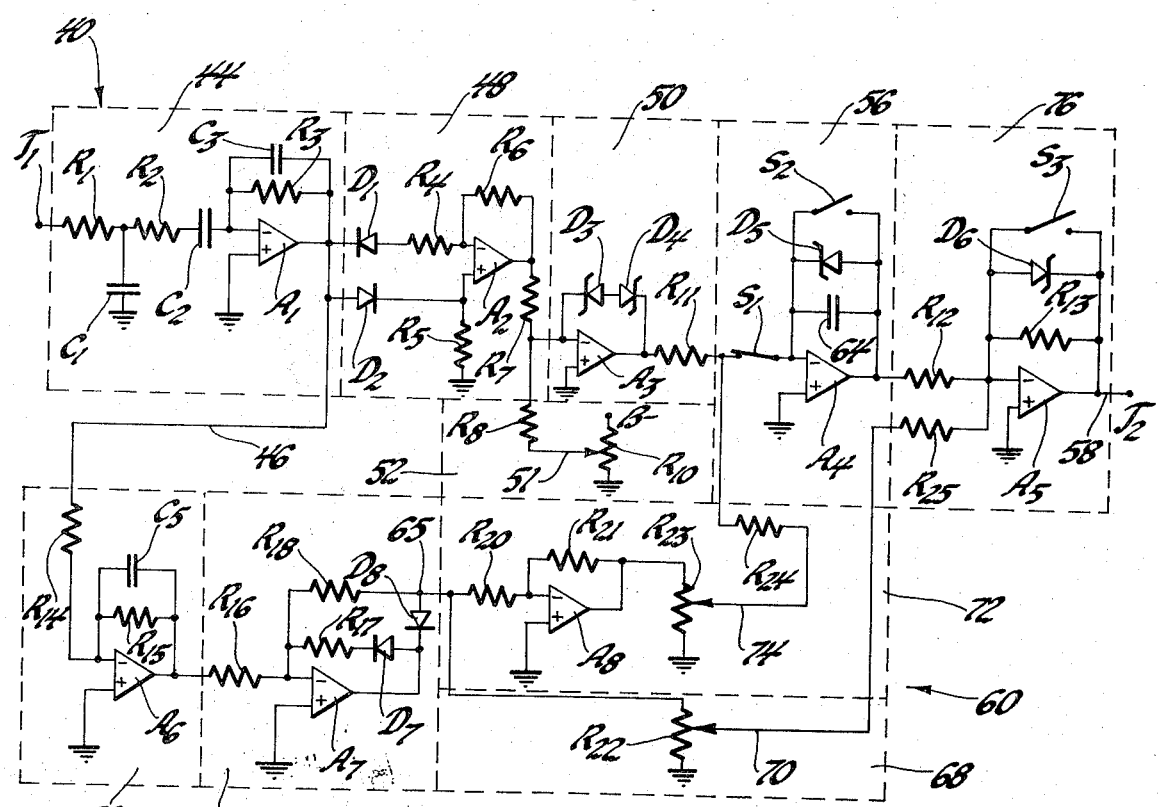

These and other objects and features of the present invention will become more apparent on the following description taken in conjunction with the following figures wherein:

FIG. 1 is a view partly in block diagram form and partly in schematic form of a closed loop internal combustion engine control system for controlling the flow of exhaust recirculation gases so as to regulate engine roughness;

FIG. 2 provides a group of charts of certain engine parameters illustrating the operation of the closed loop engine control system of FIG. 1;

FIG. 3 is an isometric view partially in cross-section and partially with parts broken away of a portion of a valve controlled conduit apparatus comprising a portion of the closed loop control system of FIG. 1; and FIG. 4 is an electrical schematic of the closed loop engine control system of FIG. 1.

With reference now to FIG. 1, there is shown an intermittently firing spark ignition internal combustion engine 10 having a closed loop engine control system 40 provided in accordance with the present invention for regulating the roughness of engine operation by controlling the flow of exhaust recirculation gases from a suitable point in the exhaust system 12 of the engine to a suitable point in the air/fuel induction system 14. Closed loop engine control system 40 includes an exhaust gas recirculation (EGR) valve-controlled conduit apparatus 80 having a variable position EGR servo valve 90 that is moved towards a full open position so as to normally bias the recirculation flow in an increasing direction as long as engine roughness is below a predetermined roughness threshold magnitude and that is moved towards a closed position to decrease recirculation flow towards a minimum when the roughness magnitude exceeds the predetermined threshold. By thus maximizing recirculation flow to follow the roughness threshold, control system 40 substantially regulates the magnitude of engine roughness while at the same time reducing the formation of certain exhaust gas constituents such as nitrous oxide $NO_x$ in the exhaust combustion products of the engine. In view of this presently preferred embodiment, control system 40 is hereinafter termed the "EGR flow control loop 40" and is illustrated in a laboratory emission testing enviroment.

As thus illustrated in FIG. 1, a branch of the engine exhaust system 12 upstream of the exhaust muffler 16 is connected to emission analyzing apparatus 18 through a cut-off valve 20, and the output of shaft 22 of the engine transmission 24 is shown connected by a suitable shaft 26 and a torque cell 28 to an engine dynamometer 30 of a programmable dynamometer torque control system operative to simulate dynamic road loads. Dynamometer 30 is responsive to commands provided by a suitable road load simulator 32 such as a computer responsive torque signals provided by torque cell 28 and brake signals provided by a driver control 34. Driver control 34 is connected to electrically and/or mechanically servo a suitable air consumption control device 36 mounted intermediate an air intake end 38 and an engine inlet end of an engine air fuel delivery passage. A flow of fuel is delivered to the air fuel delivery passage and mixed therein with an air flow admitted thereto through air intake 38 by an electronic fuel injection system which may be of the type of fuel injection system described in greater detail in co-pending and commonly assigned patent application Ser. No. 101,896 and now patent number 3734068 filed on December 28, 1970 in the name of Junuthula N. Reddy and issued on May 22, 1973 as U.S. Pat. No. 3,734,068 for a "Fuel Injection Control System."

To effect the continuous cycling of the position of the EGR valve 90 in the opening and closing directions, the EGR flow control loop 40 detects the magnitude of an engine performance related parameter varying with the EGR flow and then modifies the EGR flow so as to control the magnitude of this engine performance related parameter. One such parameter related to EGR flow is engine roughness since, as EGR flow increases, the power generated by successively firing cylinders of the engine momentarily becomes uneven or "rough." Such uneven power generation causes the torque delivered by corresponding pistons to the crankshaft to be momentarily uneven or rough, the crankshaft to in turn momentarily accelerate or decelerate in accordance with the uneven torque applied thereto, and the speed of the engine to in turn change correspondingly. Terming generically as "engine roughness" all such momentary power differences, torque changes, accelerations and decelerations, and engine speed changes, the EGR flow control loop 40 of the present invention includes apparatus operative to detect such roughness and to modify the EGR flow so as to maintain the magnitude of engine roughness below a predetermined magnitude.

A roughness sensor suitable for use with the EGR flow control loop 40 is of the type described in greater detail in the co-pending commonly assigned patent applications Ser. No. 249,440 filed on Apr. 24, 1972 in the name of Taplin et al. and entitled "Surge Sensory Apparatus For A Prime Mover," of Ser. or 346,240 filed concurrently herewith in the name of Taplin et al. and issued on Feb. 5, 1974 as U.S. Pat. No. 3,789,816 for a "Lean Limit internal Combustion Engine Roughness Control System", such applications being hereby expressly incorporated herein by reference.

Briefly, and with reference to FIG. 1, such roughness sensors comprise a speed sensor 42 which, in the presently preferred embodiment comprises a 60 toothed tachometer wheel (not shown) suitably coupled to a crankshaft driven member (not shown) of the engine 10 such as a ring gear, flywheel or pulley thereof to generate a speed signal having both high frequency components associated with engine roughness and also low frequency components associated substantially with driver commanded engine performance changes. This speed signal is applied to a filter and differentiator 44 which suitably attenuates frequencies outside a desired frequency band of about 0.1 to 20 radians per second and differentiates the remaining signal to provide on a conductor 46 a raw roughness signal varying with a derivative of the speed signal. This raw roughness signal is full wave rectified by a full wave rectifier 48 and is applied as a rectified roughness signal to a comparator 50 for comparison thereat with an adjustable high frequency roughness threshold reference provided by a roughness threshold potentiometer 52. Comparator 50, in the presently preferred embodiment, produces a comparison signal of one polarity when the magnitude of the rectified roughness signal is less than the magnitude of the roughness threshold reference and of the opposite polarity when the magnitude of the rectified roughness signal is greater than the magnitude of the roughness threshold reference, such comparison signals being communicated by conductor 54 to an integrator 56. Integrator 56 in turn generates a valve position change command and then communicates this command via a conductor 58 to the EGR servo valve 90, thereby causing EGR servo valve 90 to move towards a closed position so as to reduce the EGR flow as long as the output of comparator 50 is of the first polarity and towards a full open position so as to increase the EGR flow as long as the output of the comparator 50 is of the other polarity.

The magnitude of the roughness threshold reference provided by potentiometer 52 is selected to correspond with a level of engine roughness at which the EGR flow is made as large as possible to the point that $NO_x$ formation is minimized without the driveability of the particular vehicle being unacceptable. To effect this trade off between vehicle driveability and emission control, the setting of the roughness threshold may vary from one engine application to another. For example, the threshold may be set to tolerate engine speed changes as high as 12 r.p.m. as might be set for engines driving hydraulically coupled transmissions that hydraulically attenuate some of the roughness, or substantially lower speed changes, as might be set for engines driving clutch-coupled transmissions that transmit engine roughness relatively unattenuated, the former setting normally producing fewer emissions under comparable conditions than the latter.

Illustrated as a part of the EGR control loop 40 and operative to modify the operation thereof during certain conditions or modes of engine operation is an EGR modification sub-loop, hereinafter termed acceleration enrichment sub-loop 60 since it increases rather than decreases EGR flow during periods of low frequency engine accelerations normally associated with driver commanded vehicle accelerations, such increased EGR flow preventing the sharp increase in $NO_x$ emissions otherwise associated with such periods. Acceleration enrichment sub-loop 60 provides such $NO_x$ suppression by modifying, here by overriding, the otherwise normal operation of EGR flow control loop 40 to not just prevent closing of the EGR servo valve 90 in the presence of such low frequency accelerations but also to effect a step and thereafter a rate opening thereof, the magnitude of the step opening varying with the magnitude of the low frequency accelerations and the rate opening varying with both the magnitude and duration of such accelerations. To effect such control of the EGR servo valve 90, acceleration enrichment sub-loop 60 receives the raw roughness signal provided by filter and differentiator 44 on conductor 46 and then attenuates the higher frequency components of this raw roughness signal in a low pass filter 62. The resulting low pass signal is then rectified in a half wave rectifier 64 to block the deceleration portion of the low pass signal and provide on a conductor 66 a signal varying with just the acceleration portion thereof. Thereafter both a step command and a rate command for changing the opening of EGR servo valve 90 are generated from the magnitude of the low frequency acceleration signal provided on conductor 66 by applying this signal both to a step command potentiometer 68 and to a rate command potentiometer 72. The resulting step command output of the step command potentiometer 68 is applied directly to the EGR servo valve 90 to effect a step opening thereof, and the resulting output of the rate command potentiometer 72 is subtracted from the output of comparator 50 normally closing EGR servo valve 90, the net difference after being integrated by integrator 56 resulting in a rate command causing EGR servo valve 90 to open.

The operation of acceleration enrichment sub-loop 60 may be better understood with reference to the engine R.P.M. vs. time chart and the EGR valve position vs. time chart FIGS. 2(a) and 2(b), respectively, for low engine accelerations and corresponding charts FIGS. 2(c) and 2(d) for high engine accelerations, the indicated responses being for comparable roughness threshold references provided by roughness threshold potentiometer 52 and for the same resulting steady state engine speed. Thus, the EGR servo valve 90 opens a step amount at the onset of an engine speed increase to a steady state value, such increase being relatively smooth with time but faster for high accelerations, FIG. 2(c), than for low accelerations, FIG. 2(a). The magnitude of this step opening is proportional to the level of acceleration times a fractional constant determined by the setting of step command potentiometer 68, the step opening therefore being greater for high accelerations, FIG. 2(c), than for low accelerations, FIG. 2(d). Simultaneously with this step opening and continuing thereafter, EGR valve 90 opens at an opening rate, the magnitude of which is proportional to the level of acceleration times a fractional constant determined by the setting of the rate command potentiometer 72 and also the gain setting of integrator 56. Thus, the greater the acceleration, the greater the step opening of the EGR servo valve 90 as well as the faster opening thereof and the greater the EGR flow during acceleration to suppress $NO_x$ emissions that would otherwise be generated at higher accelerations. When the engine reaches steady state speed so that the rate of acceleration is zero, the acceleration enrichment sub-loop 60, being substantially insensitive to the magnitude of any low frequency accelerations remaining after attenuation by filter and differentiator 44, no longer contributes to the opening movement, nor prevents closing, of the EGR servo valve 90.

Ideally, the settings of the step command potentiometer 68 and especially of the rate command potentiometer 72 are controlled or pre-set to effect minimal overshoot or undershoot opening of the EGR valve with respect to its steady state position, such ideal settings being reflected by the dotted curves $b'$ and $d'$ respectively in FIGS. 2(b) and 2(d). However, as reflected by the solid portions of these curves, the actual settings potentiometers 68 and 72 may, for a given desired steady state speed, combine to provide openings greater than ideally required to cause the resulting greater actual step opening and the greater opening rate to cause the EGR valve to overshoot its steady state position, the extent of such overshoot being shown exaggerated in FIGS. 2(b) and 2(d) by portions $b''$ and $d''$ thereof respectively. With the EGR valve momentarily opened too far, the EGR flow momentarily becomes too great for the given steady state speed so that resulting engine roughness exceeds the roughness threshold. The EGR control loop 40 responds to this excessive roughness in the hereinabove described manner to effect closure of the EGR valve to its steady state position, such closure being illustrated by the exaggerated portions $b''$ and $d''$ of charts 2(b) and 2(d) respectively. In this manner the EGR control loop 40 not only controls and causes the EGR flow to follow the roughness threshold, thereby maximizing EGR while maintaining driveability as indicated by the large EGR valve openings and the relatively constant level of roughness during steady state operations indicated in the charts, but also corrects for any EGR overenrichment resulting from the operation of the acceleration enrichment sub-loop 60.

Turning now to a more detailed consideration of the EGR flow control loop 40 and with reference still to FIG. 1, the EGR valve controlled conduit apparatus 80 comprises a suitable flexible metal tube 82 connected at its inlet end to the exhaust system 12 of the engine and at its outlet end to the inlet of the EGR servo valve 90. To reduce the temperature of the exhaust gases being recirculated to a temperature comparable to the temperature effected by the ambient conditions of a passenger car vehicle, a heat exchanger 84 is inserted into the flexible tube 82 intermediate its inlet and outlet ends, heat exchanger 84 also being connected (not shown) to use engine coolant and also having a metal spiral (not shown) to swirl the gas and provide for more efficient cooling. A laminar flow meter 86 is connected to flexible tube 82 intermediate heat exchanger 84 and the outlet end of flexible tube 82 to permit suitable measuring of the EGR flow.

As may be better understood with reference to FIG. 3, EGR servo valve 90 comprises an EGR spacer block 110 mounted on a suitably configured intake manifold 112 of the engine 10. Air consumption control device 36 in the form of a throttle body 100 is fastened to EGR block 110. Each throttle bores 102a and 102b of throttle body 100 has an on center supported throttle plate 104 pivotally mounted therein on a throttle shaft 106 fixed to a throttle lever 108, throttle lever 108 being suitably connected to be controlled by driver control 34. The EGR spacer block 110 has a pair of throttle bore extensions 114a and 114b aligned with throttle bores 102a and 102b of throttle body 100, each throttle bore extension 114a and 114b having a respective circumferential internal groove 116a and 116b communicating with the outlet end 120 of an EGR main passage 122 the inlet end of which is connected by a connector 124 to communicate with flexible tube 82. To effect uniform mixture of the recirculating EGR gases with the incoming air in the case of some fuel injection systems or with air and fuel in the case of some conventionally carbureted systems, a cylindrical insert sleeve 126a and 126b having a plurality of equiangularly spaced ports 128 therethrough is inserted into a suitable downward opening counterbore 129a and 129b in each throttle bore extension 114 the ports 128 communicating a respective circumferential groove 116 of each throttle bore extension 114 with the corresponding throttle bore 102 and the counterbores 129 permitting the interiors sleeves 126 to effect a smooth flow surface with throttle bores 102.

An EGR butterfly valve 130 is mounted in EGR main passage 122 near the chamfered inlet end 132 thereof for pivotable movement with a valve shaft 134 connected by a suitable coupling device 136 to the output shaft 138 of a servomechanism 140 including a DC torque motor (not shown) and output shaft transducer (not shown). Servomechanism 140 responds to a valve position command applied thereto on conductor 58 to effect movement of the EGR butterfly valve 130 intermediate a full open position wherein the plane of the butterfly valve 130 is substantially aligned with the axis of the main EGR passage 122 and a full closed position wherein the plane of the butterfly valve 130 substantially blocks flow therethrough, the actual position of the EGR butterfly valve 130 being indicated by an indicator dial 142 mounted on the output shaft 138 of servomechanism 140.

As may be better understood with reference to the electrical schematic illustrated in FIG. 4, filter and differentiator 44 comprises three filter stages comprising resistor capacitor combinations R1-C1, R2-C2, and R3-C3, in combination with a differentiator comprising an operational amplifier A1, feedback resistor R3, and capacitor C2. As described in greater detail in the above referenced Taplin et al. application Ser. No. 249,440, the three filter stages have a common frequency break at about 20 radians per second on a log gain vs. log frequency plot and each such stage constitutes a lag type network having a transfer function characterized by $1/(\tau s + 1)$. Moreover, the differentiator has a lead type transfer function characterized by $\tau s$ so that the signal on conductor 46 at the output of amplifier A1 varies with the first derivative, in this case the acceleration or deceleration, of the speed signal applied through differentiator input terminals T1.

Full wave rectifier 48 comprises an operational amplifier having inverting and noninverting input terminals respectively connected through oppositely-polled rectifier diodes D1 and D2 to the output of filter and differentiator 44. With the anode of diode D1 connected through a resistor R4 to the inverting input terminal of amplifier A2, only negative signals are communicated thereto to produce only positive signals at the output thereof. Similarly, with the cathode of diode D2 referenced to ground through a resistor R5 and connected to the noninverting input terminal of amplifier A2, only positive signals are communicated thereto to also produce just positive signals at the output thereof.

Threshold comparator 50 comprises an operational amplifier A3, the inverting input terminal of which is connected to both the output of rectifier amplifier A2 through a resistor R6 and to the output terminal of amplifier A3 through a pair of series-connected oppositely-polled Zener diodes D3 and D4. An adjustable roughness threshold reference voltage is provided by potentiometer 52, the fixed element R10 of which is connected between a suitable negative supply and ground and the wiper arm 51 of which is connected to the inverting input terminal of amplifier A3 through resistor R8. The noninverting input terminal of amplifier A3 is grounded so that a slightly negative voltage is provided at the inverting input terminal when the output of full wave rectifier 48 is less than the roughness threshold reference provided by potentiometer 52. With this slightly negative input to the inverting input terminal of amplifier A3, the output thereof on conductor 54 is a positive value determined by the breakdown voltage of Zener D4. As the output of full wave rectifier 48 increases to exceed the roughness threshold reference provided by potentiometer 52, the voltae at the inverting input terminal of amplifier A3 becomes slightly positive to cause amplifier A3 to rapidly produce a negative output, the step change transistion from the positive to the negative output being assured by the high gain of amplifier A3 and the level of this output being determined by the breakdown voltage of Zener diode D3.

The output of comparator 50 on conductor 54 is applied via resistor R11 to a conventional integrator 56, comprising an operational amplifier A4 the inverting input terminal of which is coupled to the output terminal by a capacitor C4 and the noninverting input terminal of which is suitably grounded. Also connected between the input terminal of amplifier A4 and the output terminal thereof are both a normally-opened relay-operated initial-condition switch S1 and a Zener diode D5, initial condition switch S2 being closed during starting operations to in turn close the EGR servo valve 90 by zeroing the opening command therefor and the Zener diode D5 limiting the negative output from amplifier A4 to in turn limit the maximum opening of the EGR servo valve 90 during normal limit cycling by EGR control loop 40. To invrt the output of amplifier A4 so as to provide a command of suitable polarity to servo mechanism 140, the output terminal of amplifier A4 is connected via a resistor R12 to the inverting input terminal of an operational amplifier A5 comprising a portion of an inverting stage 76, unity gain being effected through amplifier A5 by resistor R13 connected between the output terinal and the inverting input terminal thereof. As with amplifier A4, the input and output terminals of amplifier A5 are interconnected by a normally-open relay-operated initial condition switch S2 and a Zener diode D6. Switch S2 is closed during engine starting operation to close the EGR servo valve 90 even in the presence of low level valve opening commands generated by acceleration enrichment sub-loop 60. Zener diode D6 also limits the maximum opening of EGR servo valve during limit cycling, the breakdown voltage of Zener D5 being matched to that of Zener diode D6 to avoid the error effect of any residual build up by integrator 56 that would otherwise result if D6 came out of breakdown condition before D5.

To enable acceleration enrichment sub-loop 60 to generate the step opening command and the rate opening command for EGR servo valve 90, the output of filter and differentiator 44 is communicated via conductor 46 and an input resistor R14 to the inverting input terminal of an operational amplifier A6 comprising low pass filter 62, the noninverting input terminal of amplifier A6 being suitably grounded. To effect a frequency break at about 2.0 radians per second, the inverting input terminal is connected to the output terminal by a capacitor C5 in parallel with a resistor R15, the relationship of resistor R15 to resistor R14 being selected to effect a unity gain through amplifier A6.

The output of low pass filter 62 is communicated via an input resistor R16 to the inverting input terminal of an operational amplifier A7 comprising a portion of a conventional half wave rectifier 64. The output of amplifier A7 is connected to both the anode and cathode respectively of diodes D7 and D8, the cathode and anode of which are coupled to the inverting input terinal via resistors R17 and R18, respectively. With such connection, a positive output from low pass filter 62 causes a negative voltage at the output terminal of amplifier A7. This causes current to flow from the input terinal to the output terminal to amplifier A7 through resistor R18 and diode D8 so that the resulting voltage at the node 65 between the anode of diode D8 and resistor R18 varies inversely with the product of the positive input voltage times the ratio of the forward voltage drop of diode D8 provided by the amplifier gain. A negative output from low pass filter 62 causes the resulting positive output from amplifier A7 to backbias diode D8 so that it does not conduct with the result that the voltage at node 65 is virtually zero due to the feedback from the output of amplifier A7 to the input through D7 and resistor R17. With the voltage at node 65 thus varying inversely with the presence of only positive outputs from low pass filter 62 and with connections being made so that such positive outputs from low pass filter 62 represent accelerations, the voltage at node 65 in turn represents a half wave rectification of the low frequency acceleration components of the speed signal applied to terminal T1, the deceleration portion of the low frequency signals being blocked. The voltage at node 65 is effective to cause acceleration enrichment sub-loop 60 to open the EGR servo valve only in the presence of low frequency accelerations.

To effect a step opening command for EGR servo valve 90, node 65 of half wave rectifier 64 is communicated to one end of the fixed resistor R22 of the step command potentiometer 68, the wiper arm 70 of which being adjustable to adjust the magnitude of the step command and being connected via a resistor R25 to the inverting input terminal of amplifier A5 of the signal inverting stage 76, the magnitude of resistor R25 being selected to match that of resistor R13 so as to effect a unity gain through amplifier A5.

To cause the rate command voltage to be of the proper polarity for subtraction from the output of comparator 50 on conductor 54, node 65 is connected via an inverting stage comprising an operational amplifier A8, the inverting input terminal of which is coupled to node 65 via resistor R20 and to the output terminal thereof via a feedback resistor R21. The output of amplifier A8 is communicated to one end of the fixed resistor R23 of the rate command potentiometer 72, the wiper arm 74 of which is adjustable to adjust the slope of the rate command and is connected to the inverting input terminal of integrator amplifier A4 via an input resistor R24.

The ability of the EGR flow control loop 40 to control the EGR flow so as to just follow the roughness threshold so as to maintain good driveability while also reducing $NO_x$ emissions was demonstrated using the physical simulation system illustrated in FIG. 1 to impose road load conditions on the engine 10. For example, cycling the engine in accordance with a hot 1972 CVS (constant volume sample) test cycle as specified by the Federal Register and using a constant air/fuel ratio of about 14.5:1 between the incoming air flow and the incoming fuel flow, a reduction in $NO_x$ emissions of almost 2:1 from 3.279 grams per mile to 1.91 grams per mile was observed on tests where the EGR control loop 40 was not operative compared to tests where the loop was operative. In comparative tests of the full hot CVS test cycle run with an air/fuel ratios of 17.5:1, a reduction of $NO_x$ emissions of more than 2:1 from 2.40 grams per mile to 1.00 grams per mile was observed. In these tests at each of these air/fuel ratios the gains of the step command potentiometer 68, rate command potentiometer 72 and roughness threshold potentiometer 52 were varied in such a way that the maximum amount of EGR was delivered without deteriorating driveability or increasing HC or CO emissions.

The following is a table of representative values and designations of components used to construct and operate a circuit of the type illustrated in FIG. 4 for the hereinabove indicated tests.

TABLE OF COMPONENTS

| RESISTORS (Ohms) | | CAPACITORS (Farads) | |
| --- | --- | --- | --- |
| R1 | 12K | C1 | 4μ |
| R2 | 12K | C2 | 2μ |
| R3 | 5Meg | C3 | 0.01μ |
| R4 | 10K | C4 | 5μ |
| R5 | 10K | C5 | 5μ |
| R6 | 10K | C6 | |
| R7 | 10K | | |
| R8 | 10K | | |
| R10 | 5K | DIODES | |
| R11 | 1Meg | D1 | IN4001 |
| R12 | 1Meg | D2 | IN4001 |
| R13 | 1Meg | D3 | 2N5230-4.7v |
| R14 | 10K | D4 | " |
| R15 | 100K | D5 | " |
| R16 | 10K | D6 | " |
| R17 | 10K | D7 | IN4001 |
| R18 | 10K | D8 | IN4001 |
| R20 | 10K | | |
| R21 | 10K | | |
| R22 | 5K | | |
| R23 | 5K | | |
| R24 | 1Meg | | |
| R25 | 1Meg | | |

Having described several embodiments of the invention, it is understood that the specific terms and examples are employed in a descriptive sense only and not for the purpose of limitation. Other embodiments of the invention, modifications thereof, and alternative thereto will be obvious to those skilled in the art may be made without departing from our invention. We therefore aim in the appended claims to cover the modifications and changes as are within the true scope and spirit of our invention. We claim:

1. An exhaust gas recirculation valve control system for controlling position of the exhaust recirculation valve of an internal combustion engine having a rotatable member rotatable at speed varying with the speed of the engine, said exhaust gas recirculation valve control system comprising:

a. speed sensor means responsively connected to the engine to provide a speed signal varying with the speed of the rotatable member;

b. differentiator means operatively connected to said speed sensor means for differentiating said speed signal and providing a derivative signal varying with a derivative of said speed signal;

c. rectifier means operatively connected to said differentiator means for rectifying said derivative signal and providing a rectified output signal indicating the magnitude of the speed changes;

d. comparator means operatively connected with said rectifier means for providing a comparison signal having a first magnitude when said rectified output signal is above a predetermined magnitude and a second magnitude when said rectified output signal is below said predetermined magnitude;

e. integrator means operatively connected to said comparator means for generating a control signal having a magnitude varying at a first predetermined rate when the magnitude of said comparison signal is one of said first and second magnitudes and at a second predetermined rate when the magnitude of said comparison signal is the other of said first and second predetermined magnitudes; and f. control means operatively connected to said integrator means and to said exhaust gas recirculation valve operative to control the position of said exhaust gas recirculation valve in accordance with the magnitude of said control signal.

2. The exhaust gas recirculation valve control system of claim 1 wherein said rectifier means comprise a full wave rectifier, said first predetermined rate causes said magnitude of said control signal to increase, and said second predetermined rate causes the magnitude of said control signal to decrease.

3. An exhaust gas recirculation valve control system for controlling the position of an exhaust gas recirculation valve of an internal combustion engine having a rotatable member rotatable at a speed varying with the speed of the engine, said exhaust gas recirculation valve control system comprising:

a. speed sensor means responsively connected to the engine to provide a speed signal varying with the speed of the rotatable member;

b. differentiator means operatively connected to said speed sensor for differentiating said speed signal and providing a roughness signal varying with a derivative of said speed signal;

c. integrator means operatively connected to said differentiator means for integrating said roughness signal to provide a predetermined correction signal; and d. control means operatively connected to said integrator means and to said exhaust gas recirculation valve operative to control the position of said exhaust gas recirculation valve in accordance with said predetermined correction signal.

4. A closed loop exhaust gas recirculation flow control system for controlling the magnitude of another engine performance related parameter of an internal combustion engine while also controlling the exhaust recirculation flow, the engine having engine air fuel passage means for mixing and delivering a fuel flow with an operator controllable air flow to an engine inlet, the engine also having engine exhaust means for exhausting engine combustion products, said exhaust gas recirculation flow control system comprising:

a. valve controlled exhaust gas recirculation conduit means operatively connecting the engine air fuel passage means and the engine exhaust means responsive to a recirculation flow control signal to vary a recirculation flow of engine combustion products from the engine exhaust means to the engine air fuel passage means; and b. recirculation flow control signal generation means responsive to said engine performance related parameter operative to generate said recirculation flow control signal in accordance with the magnitude of said engine performance related parameter and to communicate said recirculation flow control signal to said valve controlled exhaust gas recirculation conduit means so as to vary said recirculation flow intermediate a first continuous recirculation flow and a second continuous recirculation flow said first recirculation flow being less than said second recirculation flow and said valve controlled exhaust gas recirculation conduit means increasing said recirculation flow from said first continuous recirculation flow to said second continuous recirculation flow as said recirculation flow control signal decreases, said increasing recirculation flow reducing the $NO_x$ constituents in the engine combustion products while also increasing the magnitude of said engine performance related parameter.

5. An engine exhaust gas recirculation flow control system for controlling the magnitude of an engine performance related parameter varying inversely with the $NO_x$ constituents in the engine combustion products of an internal combustion engine, the engine having air fuel passage means for mixing and delivering a fuel flow with an operator controllable air flow to an engine inlet, the engine also having engine exhaust means for exhausting engine combustion products, said exhaust gas recirculation flow control system comprising:

a. valve controlled exhaust gas recirculation conduit means operatively connecting the air fuel passage means and the engine exhaust means responsive to a recirculation flow control signal to controllably vary the recirculation flow of engine combustion products between the air fuel delivery means and the engine exhaust means, said valve controlled conduit means operative to normally effect a first recirculation flow for minimizing the $NO_x$ constituents in the engine combustion products when the magnitude of said engine parameter is less than a predetermined value and to otherwise reduce said recirculation flow towards a second recirculation flow when the magnitude of said engine parameter momentarily exceeds said predetermined value, whereby said magnitude of said engine parameter is decreased towards said predetermined value as said recirculation flow decreases from said first flow to said second flow; and b. recirculation flow control signal generation means for generating said recirculation flow control signal for said valve controlled exhaust gas recirculation conduit means in accordance with the difference between the magnitudes of said engine performance related parameter and said perdetermined value.

6. A closed loop exhaust gas recirculation flow control system for varying inversely-related first and second engine-combustion-influenced recirculation-flow-related parameters of an intermittently firing internal combustion engine having air fuel passage means for mixing and delivering a fuel flow with an operator controllable air flow to an engine air/fuel inlet, and engine exhaust means for permitting a portion of the engine combustion products to flow from the engine to the atmosphere, said exhaust gas recirculation flow control system comprising:

a. valve-controlled exhaust-gas-recirculation conduit means adapted to permit a controllable portion of the engine combustion products to move in an engine-performance-related recirculation flow from the engine exhaust means to the engine air/fuel inlet, said valve-controlled exhaust-gas-recirculation conduit means including exhaust-gas-recirculation passage means and exhaust-gas-recirculation valve means operatively associated therewith, said valve means responsive to a recirculation flow control signal to vary said recirculation flow intermediate a first flow for limiting said first parameter and a second flow less than said first flow for limiting said second parameter; and b. recirculation flow control signal generation means having an input responsively associated with said engine to detect changes in said second parameter and having its output operatively connected to said exhaust gas recirculation valve means to provide said recirculation flow control signal thereto, whereby said recirculation flow is controlled to normally control said first parameter as long as the magnitude of said second parameter is below a predetermined level and to otherwise control said second parameter when the magnitude of said second parameter is above said predetermined level.

7. A closed-loop recirculating-exhaust-gas control system for controlling an engine combustion related parameter of an intermittently firing internal combustion engine having air fuel passage means for mixing and delivering a fuel flow with an operator controllable air flow to an engine inlet and an exhaust passage for exhausting an exhaust flow of combustion products from an engine exhaust to the atmosphere, said closed-loop recirculating-exhaust-gas control system comprising:

a. valve-controlled exhaust-gas-recirculation conduit means for recirculating a controllable recirculation flow of combustion products from the engine exhaust to the engine air/fuel inlet, said conduit means including an exhaust recirculation passage and exhaust gas recirculation valve means operatively connected thereto for controlling said recirculation flow therein in accordance with a recirculation flow control signal; and b. engine combustion-related-parameter sensor means for detecting changes in said engine combustion-related parameter and providing said recirculation flow control signal to said recirculation valve means to control said recirculation flow so as to regulate the magnitude of said changes in said engine combustion related parameter at a predetermined magnitude.

8. In the exhaust-gas recirculation control system of claim 7 wherein said intermittently firing internal combustion engine includes a variable speed member the speed of which varies with the speed of the engine and wherein said engine combustion related sensor means provides a time varying signal dependent on the speed of said variable speed member.

9. The closed loop recirculating exhaust gas control system of claim 8 wherein said time varying signal varies with a derivative of the speed of said variable speed member.

10. An engine exhaust gas recirculation flow control system for controlling exhaust gas recirculation flow of an internal combustion engine, the engine having air fuel passage means for mixing and delivering a fuel flow with an operator-controllable air flow to an engine inlet, engine exhaust means for exhausting engine combustion products, and a rotatable member the momentary speed changes of which vary with the momentary speed changes of the engine to indicate the roughness of engine operation, said exhaust gas recirculation flow control system comprising:

a. engine roughness sensing means responsive to the momentary speed changes of the rotatable member and operative to provide a roughness signal having a magnitude varying with the roughness of the engine; and b. valve controlled exhaust gas recirculation conduit means operatively connecting the engine air fuel passage means and the engine exhaust means and including exhaust gas recirculation valve means operatively connected to said engine roughness sensing means operative to normally permit a first recirculation flow of engine combustion products when the magnitude of said roughness signal is less than a predetermined magnitude and to otherwise cooperate with said engine roughness sensing means to reduce said recirculation flow from said first flow to a lower flow when the magnitude of said roughness signal exceeds said predetermined magnitude, said engine roughness sensing means and said exhaust gas recirculation valve means thereby cooperating to control said recirculation flow so as to regulate the magnitude of the momentary speed changes.

11. A closed-loop recirculating-exhaust-gas control system for controlling an engine combustion related parameter of an intermittently firing internal combustion engine having an engine inlet and an engine exhaust, said closed loop system comprising:

a. valve-controlled exhaust-gas-recirculation conduit means for communicating a controllable exhaust gas recirculation flow from the engine exhaust to the engine inlet and including variable position exhaust gas recirculation valve means operative to vary said recirculation flow continuously between a first flow and a second flow in accordance with a recirculation flow control signal;

b. engine combustion-related-parameter sensor means responsively associated with said engine to provide a sensor output signal varying with changes in said engine combustion-related parameter, said parameter being controllable by decreasing said recirculation flow as the magnitude of said parameter changes increases above a predetermined magnitude; and c. control means connected between said engine combustion related parameter sensor means and said variable position exhaust gas recirculation valve means operative to provide a recirculation flow control signal thereto for causing said recirculation valve means to normally permit a first recirculation flow when the magnitude of said engine combustion-related parameter changes is less than said predetermined magnitude and to otherwise cause said recirculation valve to reduce said recirculation flow towards said second recirculation flow as the value of said engine combustion-related parameter changes increases above said predetermined magnitude.

12. In the closed loop exhaust gas recirculation control system of claim 11 wherein said intermittently firing internal combustion engine has a variable speed member the speed of which varies with the speed of the engine, wherein said changes of said engine combustion related parameter varies with changes in the speed of said variable speed member, and wherein said engine parameter sensor is responsive to changes in the speed of said variable speed member.

13. A closed-loop recirculating-exhaust-gas control system for controlling an engine combustion-related parameter controllable by varying the recirculation flow of engine combustion products from the engine exhaust of an intermittently firing internal combustion engine to the inlet thereof, the engine having a variable speed member varying with the speed of the engine, said closed-loop recirculating-gas-control system comprising:
 a. valve-controlled exhaust-gas-recirculation conduit means operative to control the recirculation flow of engine combustion products from the engine exhaust to the engine inlet and including an exhaust gas recirculation passage and exhaust gas recirculation valve means responsive to a recirculation flow control signal to vary the recirculation flow intermediate a first flow and a second flow;
 b. speed sensing means responsively associated with said variable speed member to provide a sensor output signal varying with the changes in said variable speed member caused by changes in an engine combustion related parameter; and
 c. control means operatively connecting said speed sensing means and said recirculation valve means for providing said recirculation flow signal varying with a derivative of said sensor output signal for controlling said recirculation flow to regulate the magnitude of said changes in said engine performance rated parameter at a predetermined value.

14. A closed-loop recirculating-exhaust-gas control system responsive to an engine combustion related parameter of an intermittently firing internal combustion engine, the engine having air induction means for communicating an operator controllable air flow to an engine inlet, fuel metering means for providing a controllable fuel flow to the engine inlet in accordance with the air flow, and an exhaust gas passage for exhausting an exhaust flow of combustion products from an engine outlet to the atmosphere, said closed-loop recirculating exhaust gas control system comprising:
 a. valve controlled exhaust gas recirculation means including an exhaust gas recirculation passage connected at its one end to communicate with the engine outlet and at its other end with the engine inlet and further including a variable position exhaust gas recirculation valve, said valve controlled conduit means responsive on application of a valve control signal to said recirculation valve to vary a controllable recirculation flow of the combustion products from the engine outlet to the engine inlet;
 b. engine combustion related parameter sensor means operatively connected with the engine to provide a sensor signal varying with momentary changes in said engine combustion related parameter relative to a predetermined magnitude thereof; and
 c. recirculation valve power actuator means operatively connecting said sensor means and said recirculation valve responsive to said sensor signal to vary the position of said recirculation valve so as to control said recirculation flow to regulate said engine combustion related parameter at said predetermined magnitude.

15. An engine gas recirculation flow control system for varying in accordance with changes in an engine speed dependent parameter the recirculation flow between the engine exhaust and the engine inlet of a portion of the engine combustion products normally being recirculated to minimize the proportion of $NO_x$ constituents in the engine combustion products, the engine having air fuel passage means with an operator controllable throttle valve therein for admitting a controllable air flow, fuel metering means for providing an air-flow dependent intermittently-injected fuel flow to the air fuel passage means, and engine exhaust means for exhausting engine combustion products, said exhaust gas recirculation flow control system comprising:
 a. exhaust gas recirculation passage means having an inlet end connected to communicate with said engine exhaust means and an outlet end connected to communicate with the air fuel passage means downstream of the throttle valve;
 b. a valve positioned in said exhaust gas recirculation passage intermediate said inlet end and said outlet end continuously moveable between a first position and a second position;
 c. valve positioning means operatively connected with said valve responsive to a recirculation flow control signal to effect movement of said valve to a position between said first and second positions;
 d. speed sensor means having an input and an output, said sensor input responsively associated with the engine to detect the magnitude of said engine speed dependent parameter and said sensor output providing a speed signal varying with the magnitude of said engine speed dependent parameter;
 e. differentiator means having an input and an output, said differentiator input being connected in electrical circuit with said sensor output and said differentiator output providing a derivative signal varying with a derivative of said sensor speed signal;
 f. full wave rectifier means having an input and an output, said rectifier input connected with said differentiator output and said rectifier output providing a rectified signal varying with the absolute magnitude of said differentiator derivative signal; and
 g. comparator means having first input, a second input, and an output, said first comparator input connected to a reference voltage, said second comparator input connected to said rectifier output, and said comparator output connected in electrical circuit with said valve actuator means and providing said recirculation flow control signal thereto when said rectified output signal exceeds a predetermined voltage determined by the magnitude of said reference voltage.

16. An engine control system for controlling an engine parameter of an internal combustion engine having the rotatable member the speed of which varies with the speed of the engine:
   a. sensing means operatively associated with said rotatable member for providing a speed signal varying with the speed thereof;
   b. differentiator means operatively connected to said speed sensing means for differentiating said speed signal and providing a roughness signal varying with a derivative of said speed signal; and
   c. parameter controller means operatively connected with said differentiator means for controlling said engine parameter in accordance with said roughness signal, wherein said parameter controller means includes an exhaust gas recirculation valve operative to control the recirculation flow of exhaust gases from the engine exhaust to the engine inlet.

17. An exhaust recirculation valve control system for controlling the exhaust gas recirculation valve of an internal combustion engine having an exhaust gas recirculation flow control valve and a rotatable member rotatable at a speed varying with the speed of the engine, said exhaust gas recirculation valve control system comprising:
   a. speed sensor means responsively connected to the engine to provide a speed signal varying with the speed of the rotatable member;
   b. differentiator means operatively connected to said speed sensor for differentiating said speed signal and providing a roughness signal varying with a derivative of said speed signal; and
   c. control means operatively connected to said differentiator means and to said exhaust gas recirculation valve operative to convert said roughness signal into a predetermined correction signal and to control said exhaust gas recirculation valve in accordance with said predetermined correction signal.

18. An exhaust gas recirculation valve control system for controlling the exhaust gas recirculation valve means of an internal combustion engine having a rotatable member rotatable at a speed varying with the speed of the engine, said exhaust gas recirculation valve control system comprising:
   a. speed sensor means respectively connected to the engine to provide a speed signal varying with the speed of the rotatable member;
   b. differentiator means operatively connected to said speed sensor means for differentiating said speed signal and providing a derivative signal varying with a derivative of said speed signal;
   c. rectifier means operatively connected to said differentiator means for rectifying said derivative signal and providing a rectified output signal indicating the magnitude of the engine speed changes;
   d. comparator means operatively connected with said rectifier means for providing a roughness signal varying with magnitudes of said rectified output signal above a predetermined magnitude; and
   e. control means operatively connected to said comparator means and to said exhaust gas recirculation valve means operative to convert said roughness signal into a predetermined correction signal and to control said exhaust gas recirculation valve in accordance with said predetermined correction signal.

19. In the exhaust gas recirculation flow control system recited in claim 18, said derivative of said speed signal being the first derivative thereof for indicating engine accelerations and decelerations and said rectifier means comprising a full wave rectifier so that said rectified output signal varies with the absolute magnitudes of said engine accelerations and decelerations.

20. A method of controlling the exhaust gas recirculation flow of an internal combustion engine having a rotatable member the angular speed of which varies with the speed of the engine and the magnitude of the accelerations and decelerations of which vary with the exhaust gas recirculation flow, said exhaust gas recirculation flow being controllable by control means, said method comprising the steps of:
   a. sensing the speed of said rotatable member;
   b. generating a speed signal varying with the sensed speed of said rotatable member;
   c. differentiating said speed signal to provide a derivative signal varying with a derivative of said sensed speed;
   d. rectifying said derivative signal to provide a rectified signal varying with the magnitude of at least one of said accelerations and decelerations;
   e. generating a control signal varying with the magnitude of said rectified signal in excess of a predetermined magnitude; and
   f. controlling said exhaust gas recirculation flow by controlling said control means in accordance with said control signal.

21. An exhaust gas recirculation control system for positioning an exhaust recirculation valve of an internal combustion engine intermediate an open position permitting maximum recirculation flow and a closed position permitting minimum recirculation flow, the engine having a rotatable member rotatable at speeds varying with the speed of the engine, said exhaust gas recirculation control system comprising:
   a. speed sensor means responsively connected to the engine to provide a speed signal varying with the speed of the rotatable member, said speed signal having low and high frequency components;
   b. differentiator means operatively connected to said speed sensor means for differentiating said speed signal and providing a roughness signal varying with a derivative of said high frequency component of said speed signal;
   c. first control means connecting said differentiator means and said exhaust recirculation valve operative to bias said fuel delivery valve towards said open position when said roughness signal is less than a predetermined roughness magnitude and towards said closed position when the magnitude of said roughness signal is greater than said predetermined roughness magnitude; and
   d. second control means operatively connected between said first control means and said differentiator means for modifying said speed change related signal when the magnitude of said low frequency components exceeds a predetermined low frequency magnitude.

22. A roughness control system for controlling the roughness of an internal combustion engine having an exhaust recirculation valve controllable to vary the exhaust recirculation flow and a rotatable member the momentary speed changes of which vary with the momentary speed changes of the engine to indicate the roughness of engine operation, said roughness control system comprising:
   a. engine roughness sensing means responsively connected to the engine for sensing momentary speed changes of the rotatable member and providing a roughness signal having a magnitude varying with the sensed momentary speed changes; and
   b. control means operatively connecting the exhaust recirculation valve and the said engine roughness sensing means for controlling the exhaust recirculation flow so as to regulate the magnitude of said roughness signal at a predetermined magnitude.

23. An exhaust gas recirculation control system for positioning an exhaust recirculation valve in an exhaust recirculation conduit of an internal combustion engine intermediate an open position for permitting maximum recirculation flow and a closed position for permitting minimum recirculation flow, the engine having a rotatable member the momentary speed changes of which vary with the momentary speed changes of the engine to indicate the roughness of engine operation, said exhaust recirculation control system comprising:
   a. engine roughness sensing means responsively connected to the engine for sensing momentary speed changes of the rotatable member and providing a roughness signal having a magnitude varying with the sensed momentary speed changes; and
   b. control means connecting the exhaust recirculation valve and said engine roughness sensing means operative to normally bias the exhaust recirculation valve towards the open position when the magnitude of said roughness signal is less than a predetermined magnitude and to bias the valve towards the closing position when the magnitude of said roughness signal is greater than said predetermined magnitude, whereby the exhaust recirculation flow is controlled so as to regulate the magnitude of said roughness signal at said predetermined magnitude.

* * * * *